Oct. 15, 1940.  C. M. JAMESON  2,218,398
AUTOMOTIVE APPARATUS
Filed May 23, 1938   5 Sheets-Sheet 2

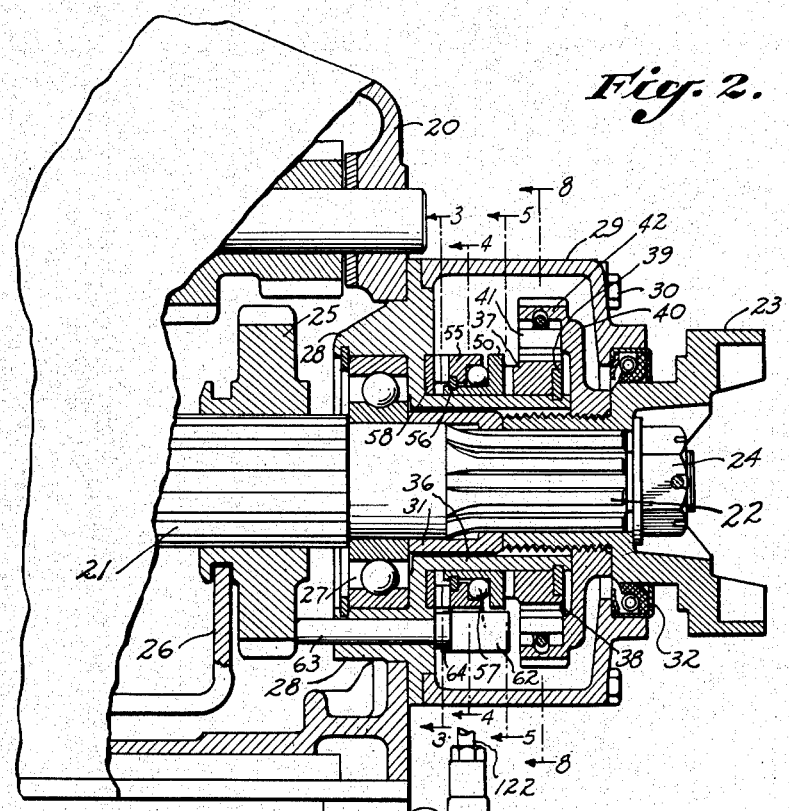

INVENTOR.
Charles M. Jameson,
BY Russell M. Otis
ATTORNEY.

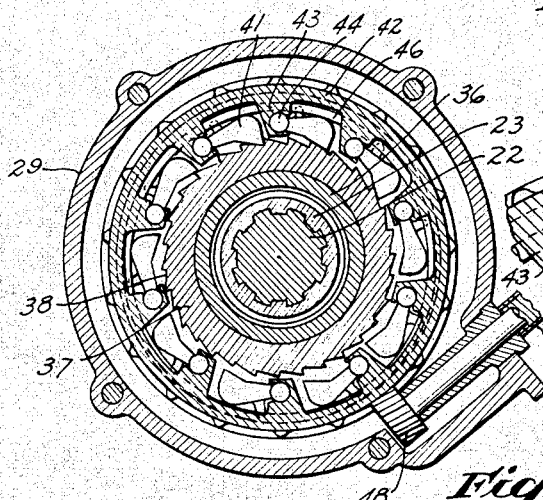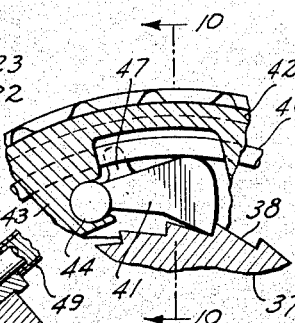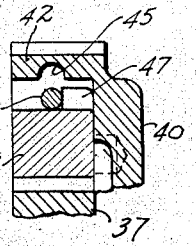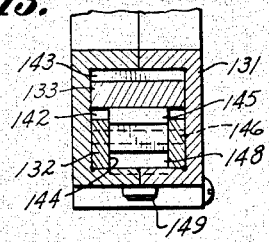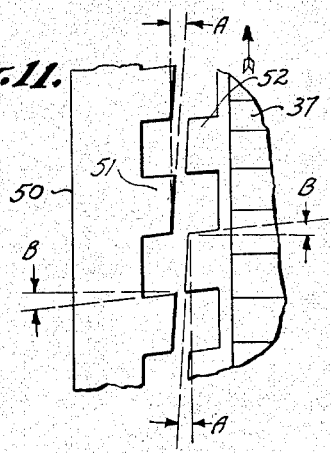

Oct. 15, 1940.  C. M. JAMESON  2,218,398
AUTOMOTIVE APPARATUS
Filed May 23, 1938  5 Sheets-Sheet 4

INVENTOR.
Charles M. Jameson,
BY  Russell M. Otis
ATTORNEY.

Oct. 15, 1940.          C. M. JAMESON          2,218,398
AUTOMOTIVE APPARATUS
Filed May 23, 1938          5 Sheets-Sheet 5
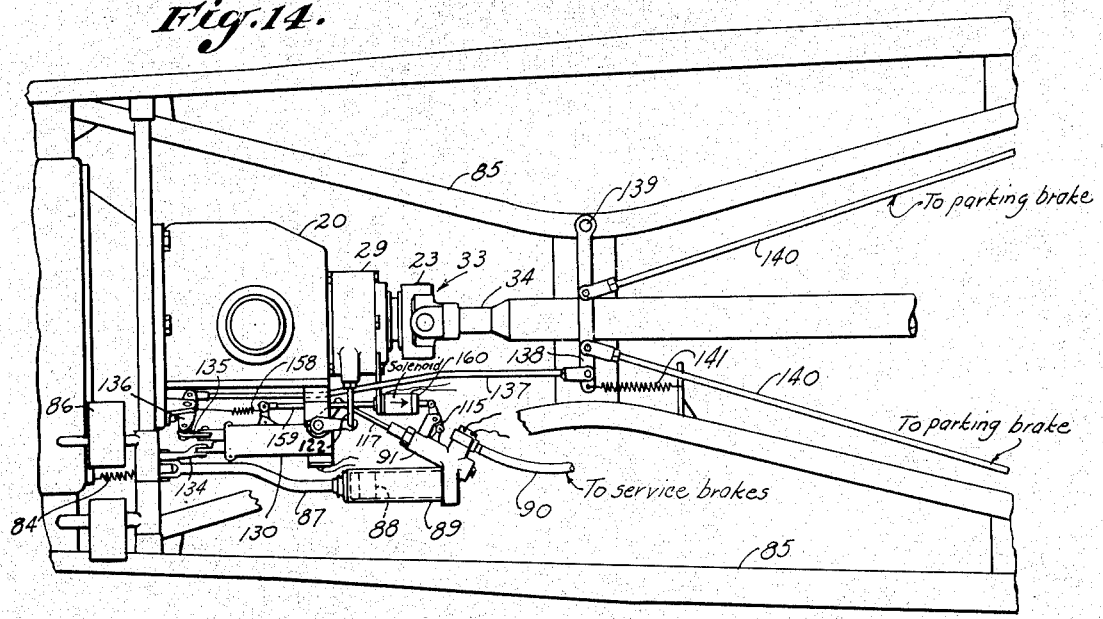
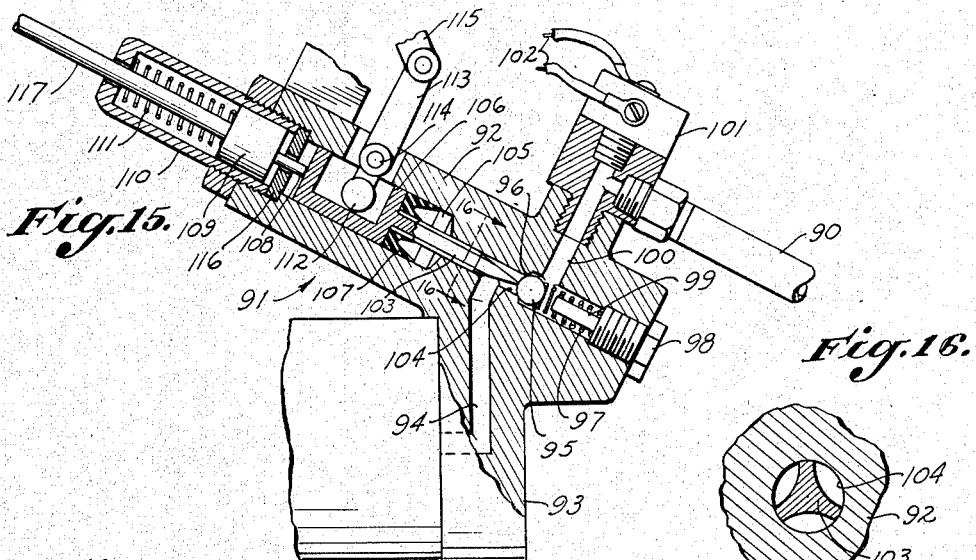
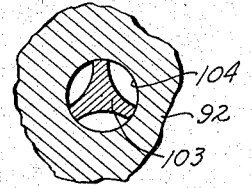
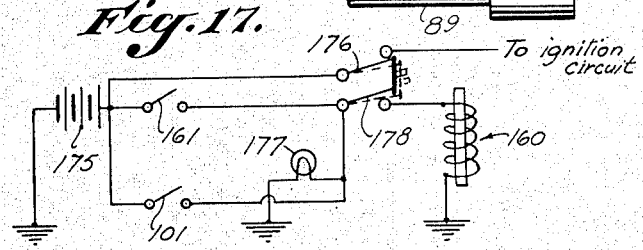
INVENTOR.
Charles M. Jameson,
BY
Russell M. Otis
ATTORNEY.

Patented Oct. 15, 1940

2,218,398

UNITED STATES PATENT OFFICE 2,218,398

AUTOMOTIVE APPARATUS

Charles M. Jameson, Los Angeles, Calif., assignor to Automotive Devices, Inc., Pasadena, Calif.

Application May 23, 1938, Serial No. 209,527

31 Claims. (Cl. 192—4)

This invention relates generally to apparatus for maintaining a vehicle against unauthorized movement. Some of the features of the embodiment of my invention herein disclosed are disclosed and claimed in my copending application, Serial No. 730,419, which has matured into Patent No. 2,135,897.

An object of my invention is to provide means for preventing unauthorized rearward movement of an automobile.

Another object of the invention is to provide means, acting upon shifting the automobile transmission into reverse or otherwise authorizing rearward movement, to make inoperative the means for preventing rearward movement of the automobile.

Another object is to provide a device, in the operation of which, it shall be easy to shift into reverse gear or otherwise authorize rearward movement without forward movement of the automobile while the mechanism is under stress, as when the car is stationary on a steep hill.

Another object is to provide a mechanism which, after the transmission has been in reverse position, does not restrict free rearward movement of the car while the gears are in any position until the car comes to rest, whereupon the means for preventing rearward movement of the car becomes operative.

Another object of the invention is to provide apparatus which, when the transmission is in any position other than reverse, and after stopping of the car by means of application of the brakes, will maintain the brakes applied until the car is authorized to move by application of power thereto or by deliberate release of the brakes by other means.

Another object of the invention is to provide means, operable when the ignition circuit is open, for actuating the parking brake by means of the service brake pedal and for automatically locking the parking brake in set position.

A further object is to provide an apparatus which is dependable, of long life, is compact, and easy of manufacture.

Still another object is to provide individual elements and units of the apparatus that are particularly efficient in performing the functions required of them in the combination.

These and other apparent objects I attain in a manner which will be clear from a consideration of the following description taken in connection with the accompanying drawings, of which:

Fig. 1 is a rear elevational view of the unit of my apparatus which is associated with the drive shaft of the automobile.

Fig. 2 is a sectional plan view of the unit of Fig. 1 taken along the line 2—2 in the direction of the arrows shown.

Fig. 8 is a sectional view of the unit of Fig. 2 taken along the line 8—8 in the direction of the arrows shown.

Fig. 9 is an enlargement of a portion of Fig. 8 showing one of the pawls.

Fig. 10 is a sectional view of the portion shown enlarged in Fig. 9 taken along the line 10—10 in the direction of the arrows shown.

Fig. 11 is an enlarged view of the toothed connection between the ratchet and the adjacent member, both parts of the unit of Fig. 2.

Fig. 13 is a sectional view of the unit of Fig. 12 taken along the line 13—13 in the direction of the arrows shown.

Fig. 14 is a partial view of the chassis of an automobile showing the disposition of the various parts and the connections between them.

Fig. 15 is an enlarged view of a valve employed in the fluid-containing system wherein fluid moves for application of the brakes.

Fig. 16 is an enlarged partial sectional view through the valve of Fig. 15 taken along the line 16—16.

Fig. 17 is a diagrammatic representation of the electrical circuit of the apparatus.

Figure 3:
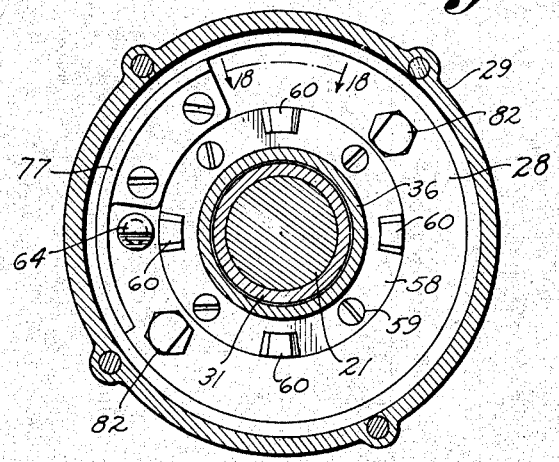
Fig. 3 is a sectional view of the unit of Fig. 2 taken along the line 3—3 in the direction of the arrows shown.
Figure 6:
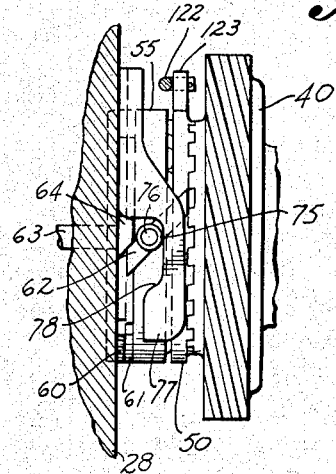
Fig. 6 is a partial view of the unit of Fig. 2 taken along the line 6—6 as indicated in Fig. 4 and in the direction of the arrows shown.
Figure 7:
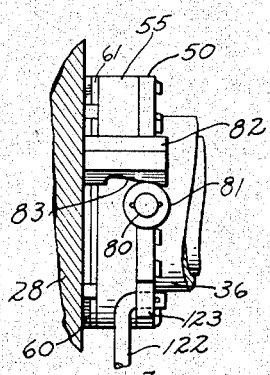
Fig. 7 is a partial view of the unit of Fig. 2 taken along the line 7—7 as indicated in Fig. 5 and in the direction of the arrows shown.

My invention is illustrated herein as applied to an automobile having a conventional transmission and brake system. The transmission is enclosed by housing 20 and is provided with drive shaft 21 which projects out of the housing with a reduced splined portion 22 to which one member 23 of the universal joint 33 is attached and retained by nut 24. The other end of the universal joint is attached to the propeller shaft 34 which extends to the rear of the car and powers the rear wheels. The transmission contains a gear 25 adapted to be slid on the splined shaft 21 by shifter 26 to bring this gear into mesh with forward or reverse gears within the transmission to effect forward or reverse rotation of the drive shaft 21 corresponding to forward or rearward movement of the automobile. In Fig. 2, the gear 25 is shown in neutral position. In shifting the transmission into reverse position to effect rearward movement of the car, the gear 25 is moved to the right in Fig. 2. The drive shaft 21 is carried in bearing 27 which is retained in member 28 fitting in the end of the transmission housing 20. The member 28 and the housing 29 for the unit presently to be described are secured to the transmission housing by screws 30. A spacer 31 abuts the inner race of the bearing 27, and the member 23 of the universal joint is forced tightly against the spacer 31 by the tightened nut 24. Thus the drive shaft 21 is adapted to rotate within the housings 20 and 29 and transmit power to the propeller shaft 34 through the universal joint 33. To prevent leakage of oil, an oil seal 32, of conventional construction, is located between the member 23 and the extreme end of housing 29.

The member 28 is preferably so shaped as to provide a cylindrical sleeve-like portion 36 extending into the housing 29 and surrounding the portion 22 of the drive shaft 21. Preferably at the far end of this sleeve 36, I mount rotatably thereon a ratchet wheel 37 having peripheral teeth 38. The ratchet wheel is retained on the sleeve by the spring ring 39 seated in a groove in the sleeve 36. Screwed on the threaded cylindrical portion of member 23 beyond the sleeve 36 so as to rotate with the drive shaft is the pawl carrier 40 carrying a plurality of pawls 41 adapted to engage the ratchet teeth on the periphery of ratchet wheel 37 at the top during very slow rotation of the pawl carrier and when it is at rest. The ratchet teeth and the cooperating pawls are so disposed that, upon engagement of the pawls with the teeth of the ratchet, the ratchet will be rotated by the pawls when the pawl carrier and drive shaft rotate clockwise in Fig. 8, corresponding to rearward movement of the automobile. During normal forward rotation of the drive shaft and the pawl carrier, centrifugal force acting on the pawls throws them out of contact with the ratchet teeth and there is then no wear on these parts. The number of teeth 38 on the ratchet wheel 37 is preferably not a multitude of the number of pawls 41, which results in some pawl always being almost in position to act upon the ratchet to move it if the pawl is permitted to do so.

The preferred construction of the pawl carrier and the manner in which the pawls are retained therein is shown in Figs. 8, 9, and 10. The pawl carrier 40 is shaped to provide a ring 42 overhanging the ratchet wheel 37. The ring 42 has a series of projections 43 extending inwardly from its inner surface. Each of these projections is bored to receive the round end 44 of a pawl 41. That part of a pawl 41 adjacent to its rounded end 44 is narrower than the diameter of the end 44, and the wall of the projection adjacent to the bored hole is broken through to accommodate this narrower portion of the pawl, in such manner that when the rounded end 44 of each pawl 41 is inserted into the hole in the projection, it is retained circumferentially with respect to the ring 42 and yet is permitted a limited rotation around the center of end 44. A groove 45 is cut through the middle of all the projections 43 and extends into the ring 42, as seen in Fig. 10. A complete ring of stiff wire 46 is located in this groove so as to be freely movable therein in its own plane and to surround all of the pawls 41. Each pawl 41 has on its outer face near the round end 44 an outwardly extending projection 47 axially limited to that portion of the pawl which is between the wire 46 and the pawl carrier 40. By this construction, when the pawls are surrounding the ratchet, the wire 46 prevents the pawls 41 from coming out of their sockets in projections 43. The ring 46 serves another function by reason of being constructed with a diameter such that when all of the pawls 41 are thrown out in contact with the ring and the ring is concentric with the ratchet wheel 37, the inner points of all the pawls just miss engagement with the teeth of the ratchet.

This construction results in the following action of the pawls. When the car comes to rest and the drive shaft stops turning, the pawls at the top of the ratchet drop into engagement therewith, by reason of not only their own weight but the weight of the pawls at the bottom and the weight of the ring as well. When the drive shaft and pawl carrier rotate in a counterclockwise direction, as seen in Fig. 8, corresponding to forward movement of the automobile, the upper pawls are raised as they ride up on the inclined faces of the ratchet teeth and bring the ring 46 and all the remaining pawls to a position symmetrical with respect to the axis of the drive shaft. When this position is achieved and the drive shaft is in normal forward rotation there is very little force tending to disturb this condition of unstable equilibrium in which the pawls do not touch the ratchet, and should the pawls contact the ratchet for any reason while the drive shaft is in forward rotation, the ring and the pawls will quickly be brought back to a concentric position by the cam action of the inclined face of the ratchet teeth engaged by the contacting pawls.

When, however, the drive shaft and pawl carrier rotate clockwise in Fig. 8, corresponding to rearward movement of the car, this cam action does not take place but the pawls instead dig into the radial faces of the ratchet teeth and tend to turn the ratchet. Any eccentricity of the ring 46 resuls in some pawls being farther from the center of rotation than others, and since the centrifugal force on the pawls that are farthest from the center of rotation is greatest the tendency is for the ring to move into as eccentric a position as possible. Since, then, during rearward rotation of the pawl carrier there is no tendency for the pawls engaging the ratchet to be lifted out by cam action, these pawls are seated more firmly in engagement with the ratchet and turn the ratchet regardless of speed of rotation. Thus, the use of the ring 46 in cooperation with the pawls and ratchet cause the pawls to rotate the ratchet upon rearward movement of the car with any speed, while when the car moves forwardly at any but a very slow speed the pawls swing free from the ratchet and at no forward speed do the pawls act upon the ratchet to turn it. This is a feature the importance of which will appear upon consideration of the operation of the apparatus as a whole.

The outer periphery of the ring 42 is preferably formed with gear teeth which mesh with a gear 48 connected to a flexible member housed in the cable 49 for operation of the speedometer of the automobile.

Adjacent the ratchet 37 is the member 50, preferably of L-shaped cross-section and mounted rotatably and slidably on the sleeve 36. The member 50 and the ratchet wheel 37 have teeth 51 and 52, respectively, adapted to mate for rotative connection between them. The teeth 51 and 52 have both sides substantially parallel to one another and the circumferential widths of the teeth 51 and 52 are substantially equal to the circumferential widths of the spaces in the opposing members into which they fit, which makes it necessary for the ratchet 37 to come substantially to rest relative to the member 50 before they can drop into rotative connection with one another. In order to make it still more difficult for the teeth 51 and 52 to mesh while moving relatively, I prefer to shape the opposing faces of both sets of teeth so that these faces stand at an angle A, preferably about 2.5 degrees, with the plane of rotation, and diverging toward the ratchet wheel as one progresses circumferentially in the direction taken by the ratchet wheel upon rearward movement of the car. The result of this construction is that when the ratchet wheel is being rotated in the direction of the arrow out of engagement with the member 50, which is being urged into engagement, the angled opposing faces of teeth 51 and 52 will contact and as the rotation of teeth 52 over teeth 51 proceeds the cam action of the angled faces forces member 50 away from ratchet 37; so that in traveling the circumferential distance equal to the clearance of the teeth, the faces of teeth 51 will again contact the teeth 52 and cause the operation to be repeated. Only when the ratchet wheel rotates extremely slowly, corresponding substantially to a condition of rest for the automobile, do the teeth 51 have time to fall into the spaces provided for them in ratchet 37. Thus, after the ratchet has been disengaged from the member 50, it is only when the car has come to rest that the ratchet can again become engaged in rotative connection with member 50. This is an important feature, the significance of which will appear upon consideration of the operation of the apparatus.

The sides of both teeth 52 and teeth 51 are preferably parallel and directed at an angle B to the axis of the drive shaft, the sides sloping in the direction taken by the ratchet wheel upon rearward movement of the car, as one progresses from the member 50 toward ratchet 37. The angle B is preferably between 5 and 10 degrees in extent dependent upon the materials of the teeth, but in any case is preferably sufficient that when torque is applied to turn the ratchet 37 in the direction of the arrow in Fig. 11 while it is in engagement with member 50, the axial force set up on member 50 by reason of the angled tooth sides is sufficient to cause the expulsion of member 50 from rotative connection with the ratchet wheel 37, if the member 50 is otherwise free to move axially.

Normally, the member 37 is in rotative connection with the ratchet 37 by reason of the meshing of teeth 51 and 52. A ring 55 is mounted rotatably on the member 50 and is retained thereon by spring ring 56 which fits into a groove in member 50. A series of balls 57 are preferably interposed between ring 55 and member 50 and act as a thrust bearing. Attached to the vertical wall of member 28 adjacent the ring 55 is a plate 58 secured by screws 59. The plate 58 and the ring 55 both have a series of projections 60 and 61, respectively, each of which has a flat face preferably connecting with the plate or ring surface by a ramp on each side. The projections 60 and 61 are adapted to contact one another on their faces when the teeth 51 and 52 are in mesh to provide rotative connection between member 50 and ratchet 37. When the ring 55 is rotated so that the projections 61 slip off of the projections 60 onto the flat surface of the plate 58, the member 50 is permitted to move away from the ratchet and under these circumstances torque applied to the ratchet will expel the member 50 from connection therewith as explained above.

Figure 4:
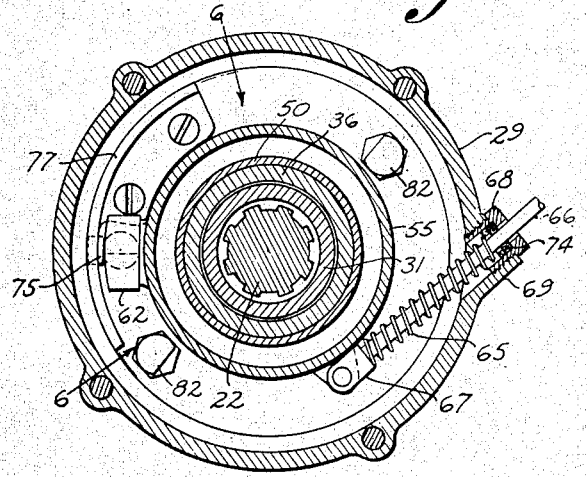
Fig. 4 is a sectional view of the unit of Fig. 2 taken along the line 4—4 in the direction of the arrows shown.

In the operation of the device it is desirable to rotate the ring 55 when rearward movement of the automobile is authorized as by shifting the transmission into reverse gear in the case of an automobile as illustrated. To this end I provide a plate 62 attached to the ring 55 and extending radially from its periphery at an angle to the axis of the drive shaft. Passing through a hole in the member 28 is a short rod 63, one end of which is adapted to bear against the side of gear 25 when being shifted into reverse position and the other end of which has a head 64 limiting its travel into the transmission case and adapted to engage the sloping plate 62 to effect rotation thereof when the rod 63 is moved in the direction of the plate. For this purpose the head 64 has a sloping surface where it contacts the plate 62. As seen in Fig. 4, rotation of the ring 55 through action of the rod 63 takes place in a counter-clockwise direction and is resisted by the spring 65 which surrounds the rod 66 and is compressed between a clevis member 67, which is loosely connected to a projecting ear on the ring 55, and a nut 68 screwed into a boss 69 on the housing 29. An oil retainer 74 is provided surrounding the rod 66. By screwing the nut 68 in or out, the compression of spring 65 may be varied. The rod 66 passes out through the nut 68 and may terminate in a head 70 which is preferably engaged by one arm of a bell crank lever 71 pivoting around the stationary pivot 72. A flexible member 73, such as a wire or cable, is fastened to the other arm of the lever 71 and may lead to the dash of the automobile. It will be observed that pulling on the wire 73 rotates the ring 55 in the same direction as it is rotated when the transmission is shifted into reverse gear and has the same effect upon the apparatus.

In order to insure positive movement of the ring 55 and member 50 when the ring 55 is rotated, as by shifting the transmission into reverse, I preferably provide a roller 75 rotatable on a pin 76 extending radially from the plate 62; and secured to the member 28 an arcuate element 77 providing a camming surface 78 for the roller 75 adapted to pull the ring 55, and therefore member 50, away from the ratchet 37 when the ring 55 has been rotated to a point where the projections 61 are not opposed to projections 60 and therefore no longer restrict axial movement away from the ratchet. By this means the member 50 is disengaged from ratchet wheel 37 whether or not torque is applied by the ratchet to expel member 50 from engagement therewith as explained above.

Figure 5:
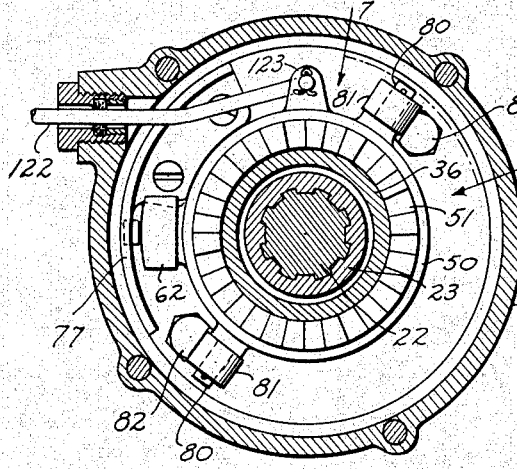
Fig. 5 is a sectional view of the unit of Fig. 2 taken along the line 5—5 in the direction of the arrows shown.
Figure 18:
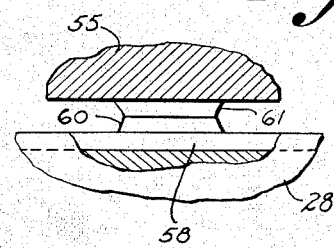
Fig. 18 is an enlarged partial view taken along the line 18—18 of Fig. 3 in the direction of the arrows shown.

The operation of that part of the apparatus above described can now advantageously be explained. Assume the transmission to be in a forward gear or in neutral, the ring 55, as seen in Fig. 4, in its normal position rotated as far as possible in a clockwise direction with its projections 61 opposite to the projections 60 of plate 58, and the teeth 51 and 52 in mesh connecting ratchet 37 with member 50. Assume that the automobile is moving forwardly. The drive shaft, and with it the pawl carrier 40 and the pawls 41 are then rotating in a counter-clockwise direction, as seen in Fig. 8, out of engagement with the ratchet which is stationary. Assume that the car travels forwardly up a hill and stops on the hill. The upper pawls 41 then drop down into engagement with the ratchet teeth 38, and if the car starts to roll backward down the hill the drive shaft, pawl carrier, and the pawls 41 will turn in a clockwise direction, as seen in Fig. 8, and will rotate the ratchet wheel 37. The member 50 will, through engagement of teeth 51 and 52, also be rotated in a clockwise direction, as seen in Fig. 5; and acting upon this rotation, means in connection with member 50 are adapted to prevent rearward movement of the automobile.

In my copending patent application above referred to, this means for preventing rearward movement of the automobile acts by applying the car brakes as well as positively limiting the rotation of the ratchet; but in the present embodiment this means preventing rearward movement of the automobile acts simply by limiting the rearward rotation of the member 50 and therefore of ratchet 37 in connection therewith. The member 50 is provided with one or more preferably radially extending arms 80 on which are rotatably carried rollers 81. In the path of clockwise rotation of the arms 80 are posts 82 securely attached to member 28. The posts 82 may have sloping surfaces 83 which are contacted by the rollers 81 and which slope in the direction taken by rollers 81 upon clockwise rotation as one proceeds along the posts toward the member 28, in such manner that a clockwise torque on member 50 tends, through the cam action of rollers 81 and posts 82, to urge the member 50 toward member 28 and away from ratchet 37 for a purpose that will hereinafter appear.

When, under the circumstances above described, the car starts backward down a hill and the ratchet 37 and member 50 are urged in a clockwise direction (Figs. 5 and 8), it will be clear that the rollers 81 will come up against posts 82, prevent further rotation of member 50, ratchet 37, pawl carrier 40, and drive shaft 21, and thus prevent rearward movement of the automobile. Should it be desired to travel in a rearward direction, the transmission may be shifted into reverse, whereupon the rod 63 acts upon the plate 62 to rotate the ring 55 until projections 61 are moved out of opposition to projections 60 permitting ring 55 to move to the left (Fig. 2). The tendency of ratchet wheel 37 is to rotate clockwise by reason of the tendency of the car to move rearwardly down the hill and this rotation is restricted by connection with member 50 so long as member 50 is restricted both axially and rotatably. But when member 50 is free to move to the left, it is quickly expelled from connection with ratchet wheel 37 by reason of the sloping teeth 51 and 52 and also because of the cam action of posts 82 and rollers 81.

As the ring 55 is further rotated the roller 75 engages the sloping surface 78 and positively holds the ring 55 and member 50 in the leftmost position. Just as soon as the ratchet wheel has been disconnected from the member 50, the ratchet is free to turn and the car can coast rearwardly or power can be applied to the drive shaft to move the car in a rearward direction. In the operation of shifting into reverse as above described, it is evident that no difficulty is encountered even though the device is under stress at the time of shifting.

While proceeding rearwardly with the transmission in reverse gear, if the transmission is shifted out of reverse into neutral or any forward gear, my device is adapted to become operative not immediately but only when the car comes substantially to rest. If the device were to become immediately operative upon shifting out of reverse while traveling rearwardly, the car would suddenly stop and the severe jolt that would be experienced would be dangerous to both the occupants of the car and the device itself. In my copending application above referred to, I provided means for making operative the rearward-movement-preventing-means only after forward rotation of the drive shaft; but the present embodiment has an important advantage over my prior device. In the device as disclosed in my other application one might roll the car in reverse down a hill, but upon attempting to again go forward up the hill one would find the car able to roll backward until after forward rotation of the drive shaft had taken place, and thus, for a brief period he would experience the difficulty which it is the object of devices of this character to eliminate. In the present embodiment this difficulty is entirely avoided, for no forward rotation of the drive shaft is necessary to place the rearward-movement-preventing-means in operation, but the car is only required to come to rest.

The operation of the device following rearward movement in reverse gear is as follows: When the transmission is shifted out of reverse gear, the spring 65 tends to rotate the ring 55 in a clockwise direction. The ramped surfaces of projections 60 and 61 contact and urge the teeth 51 of member 50 into engagement with the teeth 52 of ratchet wheel 37. While the car is moving rearwardly the ratchet wheel 37 rotates, this being assured by the action of ring 46, pawls 41 and ratchet teeth 38 as above explained. Thus the teeth 52 continue to move relatively to teeth 51 until the car comes to rest, and since by reason of their construction the teeth 51 and 52 cannot mesh until they are at rest relatively, it is necessary that the car come to rest before the teeth 51 and 52 mesh and the device again becomes operative to prevent rearward movement of the vehicle. Upon the car coming to rest, it is automatically held against rearward movement and can again be operated in the normal manner as described above.

Another function performed by the apparatus of my invention is to maintain the brakes of the automobile applied once the car has been brought to rest by application of the brakes, until power is applied to the drive shaft to turn it or the brakes are deliberately released. In accomplishing this function the parts above described cooperate with others which will now be described. The present embodiment of my invention is illustrated in connection with an automobile having fluid or hydraulic brakes providing a fluid-containing system adapted to move fluid therein upon application of said brakes, and it is understood that this fluid-containing system may, as in the present instance, be the medium through which pressure is applied to operate the brakes, or may, as illustrated in my copending application above referred to, be an auxiliary system in which fluid is moved upon application of the brakes and in which release of the brakes may be controlled by controlling motion of the fluid in the system. In the present instance I have illustrated my apparatus as installed on an automobile having a frame 85, a service brake foot pedal 86 mounted to rotate on a member of the frame, and adapted to force the rod 87 in a rearward direction when the pedal is pressed to apply the brakes. The spring 84 acts to return the pedal 86 to normal released position. The rod 87 acts on the piston 88 of the master cylinder 89 of the fluid brake system to force fluid through conduit 90 toward the individual fluid-operated brake units on the wheels of the vehicle. It is deemed unnecessary to illustrate or describe in further detail the master cylinder 89 or the fluid-operated brake units on the wheels as these may be of standard construction and are well known in the art.

I preferably place in this fluid containing system between the master cylinder and the fluid-operated brake units a check valve 91 permitting fluid to flow in such direction as to apply the brakes but closable to prevent return of the fluid after application of the brakes, and I provide means for opening this check valve. The valve 91 is preferably constructed as shown in Fig. 15. A body 92 preferably of generally cylindrical shape has a cap-like side extension 93 adapted to fit over the end of the master cylinder 89 and has a passage 94 therethrough communicating with the fluid chamber of the master cylinder. In a central passage of the valve, the ball 95 is adapted to seat on the valve seat 96, which may be of metal or, if desired, of rubber or other flexible material, to make a fluid-tight seal. The spring 97 bears on the ball 95 and urges it against the seat 96. Screwed into the body 92 is a plug 98 having a cylindrical extension 99 extending inside the coil spring 97. By adjusting the screw plug 98 the compression of spring 97 may be varied. The passage 94 communicates with the side of the ball 95 opposite to that acted upon by spring 97 in such a way that fluid under pressure in passage 94 may open the valve against the spring pressure and escape through passage 100 communicating with the other side of the ball 95 and the conduit 90. The stop-light switch 101 is attached to the valve and also communicates with the passage 100 in such a manner that when pressure exists in passage 100 to operate the brakes, the switch 101 operates to close the circuit between conductors 102 which includes the car battery and stop-light. The details of construction of the pressure-operated switch 101 are omitted as such switches are in common use and well known in the art.

Acting upon ball 95 to lift it from its seat is the pointed end of pin 103 which is slidable in the passage 104. That part of pin 103 which lies in passage 104 is shaped as shown in Fig. 16 so as to both guide the pin and permit passage of fluid therealong. The passage 104 communicates with the entrance passage 94 of the valve and also with a chamber 105 in which is located the slidable piston 106 connected to pin 103. A rubber sealing face 107 is provided for the piston adapted to seal the fluid against leakage at both the pin 103 and the wall of chamber 105. The piston 106 is acted upon by pin 108 which is part of the block 109 slidable in the cap 110 and urged in the direction of the valve by spring 111. The piston 106 is preferably slotted to accommodate the end 112 of a lever 113 pivoted at 114 in the body 92 and which may be operated by swinging lever 115 in the direction of the arrow to cause end 112 to move piston 106 and pin 103 to lift the ball 95 from its seat. The spring 111 is sufficiently strong, when the fluid in chamber 105 is not under pressure, to force the pin 103 against ball 95 and hold it open against the force of spring 97. The motion of the block 109 is limited by engagement with stop 116. Attached to block 109 and passing out through the end of cap 110 is the rod 117 which connects with the horizontal arm 118 of a bell crank lever having an elongated vertical pivot rod 119 supported rotatably on a bracket 120 attached to the transmission housing 20. The other horizontal arm 121 of the above-mentioned lever connects with a rod 122 which passes through the housing 29 and connects with an ear 123 on the member 50. The connections are such that movement of pin 103 away from ball 95 results in clockwise rotation of member 50 (Fig. 5).

The operation of the apparatus in maintaining the brakes applied after bringing the car to rest is as follows: Normally the block 109 rests against the stop 116, the ball 95 is held off seat 96 by pin 103, and the member 50 stands rotated through a small angle in the counter-clockwise direction from its position shown in Fig. 5. Under these circumstances, when the brakes are applied by pushing pedal 86, fluid is forced out of the master cylinder 89 through passage 94, past the valve, through passage 100 and conduit 90 to the fluid-operated brake units to set the brakes. At the same time, fluid in the passage 104 and chamber 105 acts on the face 107 of piston 106 and forces it against the compression of spring 111 to a point where the pin 103 cannot touch the ball 95 when on its seat 96. The ball 95, will, however, continue to be lifted off seat 96 as long as fluid from the master cylinder is forced to the brakes; but when the flow of fluid through the valve ceases due to stopping the pedal 86, the ball 95 tends to return to its seat by reason of the spring 97 acting on it. Unless prevented by pin 103 the ball 95 will so return to its seat and prevent escape of the fluid in the conduit 90 and brake units and will maintain the brakes applied. As will presently be explained, the apparatus is adapted to hold the pin 103 away from ball 95 only when the car has been brought to rest by application of the brakes. Assume for the moment that nothing restrains the block 109 from returning to act on piston 106, which, however, is itself prevented from returning to open the valve by reason of the high fluid pressure in chamber 105. When, under these circumstances, the foot is withdrawn from the pedal 86 and the piston 88 of the master cylinder is returned toward normal position by spring 84, the fluid pressure in chamber 105 drops below that required to overcome the spring 111 and the pin 103 snaps against the ball 95 to open the valve and release the brakes. This is the action that occurs when the brakes are applied and released without bringing the car to rest. In actual practice this action occurs so quickly that one is not conscious of any irregularity in the braking.

When the brakes are applied and the piston 106 is moved to the left in Fig. 15, the member 50, as explained above, is rotated in a clockwise direction (Fig. 5), this rotation being limited by engagement of rollers 81 against posts 82. If the transmission is in any other gear than reverse and the car is not traveling rearwardly, the ratchet wheel 37 is normally in rotative connection with the member 50 through teeth 51 and 52, so that the ratchet wheel 37 will also be rotated through a slight angle in a clockwise direction. But, since while the car is moving forwardly, the pawls 41 are rotating in a counterclockwise direction around the ratchet wheel 37, there can be nothing in this structure under these circumstances, to hold the ratchet 37, member 50, rod 117, etc., in the position into which they were moved by application of the brakes. Hence, while the car is moving forwardly, the brakes can be set and released at will as explained previously. It will also be clear that the same situation exists while the car is moving rearwardly in reverse gear or in any gear following reverse gear, for under these circumstances, the member 50 is disconnected from the ratchet wheel 37.

This situation is changed, however, if the car is brought to rest, for then the pawls 41 engage the ratchet teeth 38 and hold the ratchet wheel 37 and member 50 from turning back in a counter-clockwise direction. Consequently, the rod 117 and block 109 are held from returning to their normal position and there is nothing to force the pin 103 against the ball 95 to lift it from its seat against the pressure of fluid in passage 100 and the force of spring 97. The valve therefore closes and remains closed when pressure is no longer applied to the brake pedal, and the brakes are maintained applied. Thus, only when the car has been brought to rest with the brakes applied are they maintained applied.

To release the brakes, the transmission may be shifted into reverse gear, thereby disconnecting the ratchet wheel 37 and the member 50, or the ring 55 may be rotated by pulling wire 73 to accomplish the same result. But no operation is required of the driver if he wishes to proceed forwardly by applying power to the drive shaft. When he applies power to the drive shaft in the forward direction the natural flexibility of the propeller shaft 34 and connected parts is sufficient to permit the pawls 41 to relax through a small angle in a counterclockwise direction enough to permit the ratchet 37 and member 50 to return sufficiently far to allow pin 108 to engage the piston 106 and force the pin 103 to lift the ball 95 and release the brakes. In actual practice there is no observable delay or irregularity in the release of the brakes in this manner.

Figure 19:
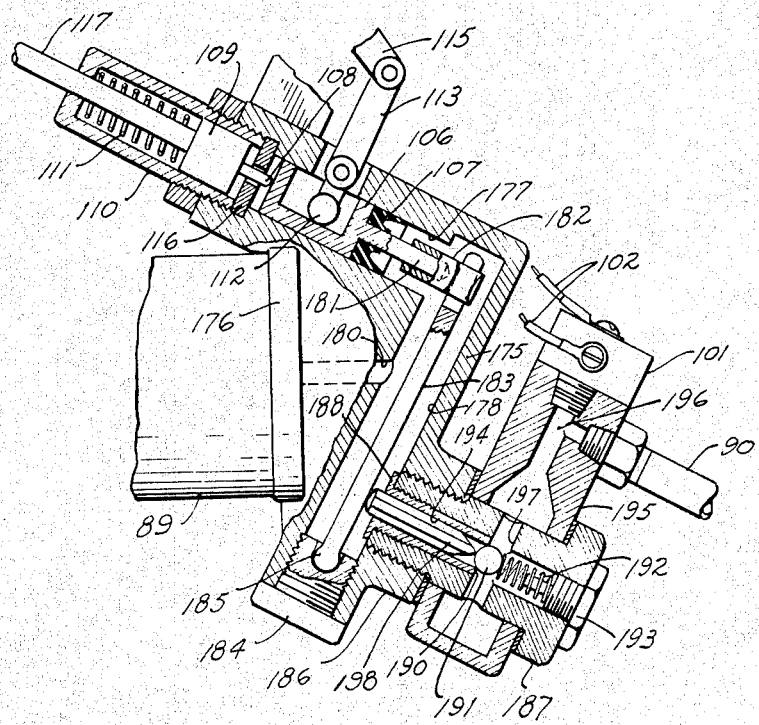
Fig. 19 is an enlarged view, partly in section, of an alternative form of valve employed in my apparatus.

While I have shown the piston 106 acting directly to move the pin 103, I may, if desired, construct the valve so that the piston acts on the pin through a lever in such a way that the force applied to the pin is greater than the force of fluid on the piston, and in this manner the area of the piston may be reduced. A valve constructed in this manner is illustrated in Fig. 19. The body 175 of this valve may have a cap portion 176 adapted to fit over and attach to the master cylinder 89. Preferably the body 175 provides two preferably right-angularly disposed intersecting passages 177 and 178. A fluid passage 180 connects the interior of the master cylinder 89 with the passage 178. In the passage 177 are located the piston 106 with the sealing face 107, the pin 108, the block 109, the cap 110, the spring 111, and associated parts, which may be similar to those shown in the valve 91, previously described. Instead of the pin 103, shown attached to the piston 106 in the valve 91, however, a pin 181 is attached to the piston 106, and carries a member 182 which may be pressed thereon or otherwise secured thereto. The member 182 preferably has an end portion of I section, the web of which is straddled by the slotted end portion of a lever 183 which extends longitudinally within the passage 178. The passage 178 is closed at its end by a plug 184 which is screwed thereinto and which provides a bearing socket for the ball-shaped fulcrum end 185 of the lever 183. The member 182 is relieved at the sides thereof, adjacent the lever 183 to permit a slight relative rotation.

Near the end 185 of the lever 183 a boss 186 is formed on the body 175 into which is screwed a fitting 187 having a passage therethrough. A sleeve 188 is screwed into the end of the fitting and provides a seat 190 on its inner end for the ball 191 which is adapted to be forced against the seat by a spring 192 held against the ball by a plug 193 screwed into the end of the fitting 187. The interior surface of the sleeve 188 forms the wall of a fluid passage 194 connecting with the passage 178 and closed by the ball 191 when seated against the seat 190. Clamped between the fitting 187 and the boss 186 is a fitting 195 having a fluid passage 196 therein in communication with an outlet passage 197 of the fitting 187 on the opposite side of the ball 191 from the passage 194. The conduit 90 and the stop-light switch 101 are attached to the fitting 195 and communicate with the passage 196. Within the passage 194 is located a pin 198 which is adapted to engage the lever 183 at one end and to engage the ball 191 at the other end in such manner that when the pin 198 is acted upon by clockwise rotation of the lever 183 about its fulcrum at 185, as seen in Fig. 19, the pin 198 forces the ball 191 off its seat 190 and connects the passage 194 with the passage 197. The pin 198 is preferably shaped in cross-section similar to the pin 103, as illustrated in Fig. 16, to permit passage of fluid through the passage 194.

It will be evident that the spring 111 can act through block 109, pin 108, piston 106, pin 181, lever 183, and pin 198 to lift the ball 191 from its seat. Fluid pressure can be exerted by the master cylinder upon the piston 106 through the passages 180, 178 and 177, and fluid can pass to the conduit 90 and to the stop-light switch 101 through the passages 180, 178, 194, past the open valve, and through the passages 197 and 196. The operation is similar to that of the valve 91 described above except for the multiplication of forces produced by the lever 183. It will be clear that the force exerted on the pin 198 by action of the spring 111 is, by reason of the relative closeness of the pin 198 to the fulcrum of the lever 183, at 185, much greater than the force of the spring 111. This means that the force of the spring 111 may be made less in the valve of Fig. 19 than in the valve of Fig. 15, and since the fluid force required to be exerted on the piston 106 to overcome the force of the spring 111 is, therefore, also less in the case of the valve of Fig. 19, it is possible to employ in the latter valve a piston of smaller area if the valve is to open at a given fluid pressure; or if the piston area is maintained the same, the spring 111 may be overcome at a lower fluid pressure.

My invention also contemplates means, operable when the ignition circuit is open, for actuating the parking brake by means of the service brake pedal and for automatically locking the parking brake in set position. By this means, the necessity of having a separate parking brake lever and its attendant connections is avoided. A parking brake unit 130 is provided comprising a tubular housing 131 preferably of rectangular cross-section in which are adapted to slide two bars 132 and 133. The bar 132 is connected with the service brake pedal 86 by link 134 which moves in the same direction as rod 87 upon movement of the brake pedal. When the service brake pedal 86 is depressed to apply the service brakes, the bar 132 is moved toward the right in Fig. 12. The bar 133 is connected to the parking brake through link 135, lever 136 having a stationary fulcrum, rod 137, lever 138 pivoting about a stationary pivot 139 and brake rods 140 leading to the parking brakes on the two rear wheels. The parking brakes are adapted to be applied when rod 137 is moved to the left in Fig. 14, or when rod 135 is moved to the right in the same figure. A spring 141 urges the parking brake system to the released position. It will be understood that my invention is equally applicable to cars equipped with other types of parking brakes, such as one which brakes the propeller shaft rather than the wheels.

Figure 12:
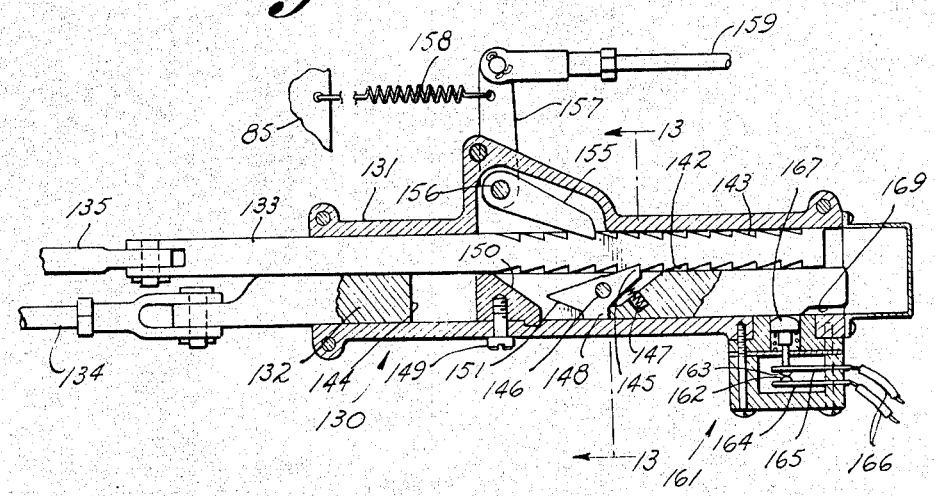
Fig. 12 is a sectional view taken longitudinally through the unit providing connection between the parking brake and the service brake actuating means.

In Fig. 12, the bar 133 must be moved toward the right to effect application of the parking brake. This movement is adapted to be accomplished by reason of a pawl and ratchet connection between the bars 132 and 133. The bar 133 preferably has ratchet teeth 142 formed on the side adjacent the bar 132 and also on the opposite side at 143. Both sets of ratchet teeth are directed so that pawls in engagement therewith can exert a force on the bar 133 toward the right in Fig. 12. The bar 132 has a slot 144 therethrough in which is pivotally supported a pawl 145, the pivot 146 of which is carried by bar 132. The pawl 145 is urged into engagement with the ratchet teeth 142 by spring 147, and a heel 148 of the pawl 145 limits the rotation of the pawl by abutting the end of slot 144. Mounted on the housing 131 within the slot 144 by screw 149 is a block 150 having a sloping surface facing the pawl 145 which, in the extreme leftmost position of bar 132, is adapted to engage the sloping under surface 151 of the pawl 145 and hold the pawl from engagement with the ratchet teeth 142.

The ratchet teeth 143 of bar 133 are adapted to be engaged by a pawl 155 pivoting about a pivot 156 supported by the housing 131. The pawl 155 has attached thereto an arm 157 extending through the housing and urged by spring 158 in such a direction as to disengage the pawl 155 from the ratchet teeth 143. The arm 157 is connected to rod 159 which is attached to the armature of solenoid 160 which is adapted when energized to pull the armature and rod 159 to the right, to engage the pawl 155 with ratchet teeth 143 in opposition to spring 158. A continuation of the armature of solenoid 160 preferably connects with one end of the lever 115, the other end of which connects with lever 113 in such manner that upon operation of the solenoid the lever 113 is swung so as to contact the end 112 with the piston 106 to move it and the pin 103 to lift the valve and release the service brakes.

Attached to housing 131, near the end of the bar 132, is the switch 161, preferably having electrical contacts 162 and 163 attached to the flat electrically conducting spring elements 164 and 165, which normally hold the contacts 162 and 163 separated from one another. Conductors 166 connect with the spring elements 164 and 165. A button 167 of electrically insulating material is urged by spring 168 against the bar 132 and has its opposite end adapted to engage the spring element 165 and force contact 163 into electrical contact with contact 162. The end of bar 132 which rides over button 167 is cut away at 169 and the dimensions of the various parts are such that when the bar 132 is at the left in Fig. 12, the service brake being off, the button engages the cut away portion 169 of the bar 132 and the switch is open; while when the service brake is applied and bar 132 is moved to the right, the button 167 will be depressed and the switch 161 will be closed.

The electrical circuit is diagrammatically represented in Fig. 17. The car battery 175 is shown with one terminal grounded, the ground being constituted by the frame of the car. The other terminal of the battery 175 is connected through the switch 176 to the ignition circuit of the car. A second circuit from the battery preferably leads through stop-light switch 101 to the grounded stop-lamp 177 and to one terminal of the switch 178. A third circuit preferably leads from the battery through switch 161 to the same side of the switch 178 to which the stop-lamp 177 is connected. The other side of switch 178 is connected to one terminal of the winding of the solenoid 160, the other terminal of which is grounded. The switches 176 and 178 are mechanically connected so that when, as shown in solid lines, the ignition switch 176 is closed, the switch 178 is open; and when, as shown in dotted lines, the ignition switch 176 is in the "off" position with the ignition circuit open, the switch 178 is closed. Thus, the solenoid 160 can be energized only when the ignition circuit is open and when either switch 101 or switch 161 is closed, and neither switch is closed unless the service brake is applied. The switch 161 is really unnecessary if the stop-light switch is dependable, but the switch 161 is shown here, mechanically operated upon application of the brakes, to provide a double insurance of dependable operation. It will be understood, of course, that for the purpose involved herein, the switch 161 may, if desired, be employed exclusively to energize the switch 178.

The operation of the apparatus in applying and holding the parking brake is as follows: In normal driving of the car, application of the service brake will move bar 132 to the right in Fig. 12 and through engagement of pawl 145 with teeth 142 will move bar 133 a corresponding distance and will tend to apply the parking brake. The parking brake, however, is preferably adjusted so that normal application of the service brake does not in this manner apply the parking brake in any appreciable degree. Since in normal driving, the ignition circuit is closed, the solenoid 160 is not energized and the pawl 155 is held out of engagement with the ratchet teeth 143. There is, therefore, nothing to hold the parking brake applied and the service brake can be operated indefinitely without setting the parking brake.

When, however, the car is brought to a stop, the ignition switch is turned off, and the service brake is applied, the solenoid 160 will be energized and the pawl 155 will be brought into engagement with the teeth 143 to hold the bar 133 in the rightmost position, to which it is brought by movement of the bar 132 and pawl 145. When the service brake is released, the cut-away portion 169 will come over the button 167, the switch 161 will open, and the current in the solenoid circuit will cease flowing, but the pawl 155 will continue to remain in engagement with the teeth 143 by reason of friction. As previously stated, the parking brake adjustment is such that one application of the service brake is insufficient to apply the parking brake; but with the pawl 155 holding, it is only necessary to push repeatedly on the service brake pedal 86—ordinarily two or three applications are sufficient—to force the bar 133 farther to the right with each application until the parking brake is applied to the extent desired. The parking brake will then be maintained applied by friction of the pawl 155 against the teeth 143. When it is desired to release the parking brake, the ignition circuit is closed and the service brake pedal is pushed sufficiently to relieve the force against the pawl 155 which will then snap out of engagement with teeth 143 by action of the spring 158. Upon relieving the pressure applied to the service brake pedal, the bar 132 will move into its leftmost position, and the pawl 145 will be lowered from possible engagement with the ratchet teeth 142, permitting the bar 133 to move to its leftmost position and release the parking brake.

As illustrated, when the ignition circuit is open, and the service brake is applied, the resulting operation of the solenoid 160 preferably causes the lever 113 to move to open the valve 91 and permit release of the service brake. This is to insure that the driver does not employ his service brake as a parking brake, for while the service brake is maintained applied when the car is brought to a stop and the valve 91 will hold for a long time, it is nevertheless considered safer not to depend upon the tightness of the valve 91 for a matter of hours as might be done in parking. With the arrangement illustrated, when the driver turns off his ignition switch, as is done when parking for a long time, if his service brake is applied it will immediately be released, indicating to him the necessity of applying his parking brake; and if his service brake is not applied and he attempts to apply it, he will find that it will not be maintained applied when his ignition switch is off.

It will be understood that while my invention is herein illustrated in connection with an automobile of conventional design and construction, it may be employed on any automobile or other vehicle to serve its intended function. The transmission may be of any character, whether or not involving gears, or the power plant may be of such character that no transmission at all is required, or other variations in vehicle construction may be made, so long as the equivalent elements and functions required by the claims are present. It is further understod that the embodiment of my invention disclosed herein as illustrative, but that variations and modifications of design and construction may be made by those skilled in the art without departing from the spirit and scope of the invention defined in the appended claims.

I claim as my invention:

1. In a vehicle having a drive shaft, the combination of a ratchet wheel, pawls engageable with said ratchet wheel tending to turn said ratchet wheel upon rearward movement of the vehicle, a carrier for said pawls rotated by said drive shaft, and a ring movable in its own plane surrounding said pawls in contact therewith.

2. In a vehicle having a drive shaft, the combination of a ratchet wheel, pawls engageable with said ratchet wheel tending to turn said ratchet wheel upon rearward movement of said vehicle, a carrier for said pawls rotated by said drive shaft, a ring movable in its own plane and surrounding said pawls, said ring being of such diameter that when in concentric position with respect to said ratchet wheel said pawls are limited in their outward radial movement to just permit their disengagement with said ratchet wheel.

3. In a vehicle having a drive shaft, the combination of a ratchet wheel, pawls engageable with said ratchet wheel tending to turn said ratchet wheel upon rearward movement of said vehicle, a carrier for said pawls rotated by said drive shaft, a ring axially retained in said pawl carrier but movable in its own plane and surrounding said pawls, and a projection extending outwardly from each of said pawls, said projections being located between said ring and said pawl carrier in such manner as to axially retain said pawls in said pawl carrier.

4. In a vehicle, the combination of a rotatable member, means adapted to rotate said member only upon rearward movement of said vehicle, a second member axially slidable and capable of a limited rotation, said second member being in toothed engagement with said first member, means acting upon rotation of said second member to prevent rearward movement of said vehicle, a third member rotatable and connected for axial movement with said second member, means adapted in the normal position of said third member to prevent axial movement of said second and third members away from said first member but upon rotation of said third member to permit axial movement of said second and third members away from said first member, means for rotating said third member out of its normal position upon authorizing rearward movement of said vehicle, and means acting upon continued rotation of said third member to axially move said second and third members away from said first member to disengage said second member from said first member and hold it disengaged.

5. In a vehicle having a drive shaft, the combination of a ratchet wheel, pawls engageable with said ratchet wheel to rotate said ratchet wheel upon rearward movement of said vehicle, a pawl carrier for said pawls rotated by said drive shaft, a member in toothed engagement with said ratchet wheel, means acting upon rotation of said member to prevent rearward movement of said vehicle, a second member rotatable and connected for axial movement with said first member, means adapted in the normal position of said second member to prevent axial movement of said first and second members away from said ratchet wheel but upon rotation of said second member to permit axial movement of said first and second members away from said ratchet wheel, means for rotating said second member out of its normal position upon authorizing rearward movement of said vehicle, an outwardly projecting portion on said second member, and a stationary part having a surface adapted upon continued rotation of said second member to be engaged by said projecting portion to axially move said first and second members away from said ratchet wheel.

6. In a vehicle having a transmission with forward and reverse positions and a drive shaft, the combination of a ratchet wheel, pawls engageable with said ratchet wheel to rotate said ratchet wheel upon rearward movement of said vehicle, a pawl carrier for said pawls rotated by said drive shaft, a member in toothed engagement with said ratchet wheel, means acting upon rotation of said member to prevent rearward movement of said vehicle, a second member rotatable and connected for axial movement with said first member, said second member and a stationary part of said vehicle having projecting surfaces opposed in contact in the normal position of said second member in such manner as to prevent axial movement of said first and second members away from said ratchet wheel, a surface on said second member sloping with respect to the axis thereof, and an element in engagement with said sloping surface and adapted to be moved toward said surface upon shifting said transmission into reverse position in such manner as to cause rotation of said second member from its normal position, whereby the projecting surface of said second member is rotated out of opposition with the projecting surface of said stationary part and said first and second members are permitted to move axially away from said ratchet wheel.

7. In a vehicle having a drive shaft, the combination of a rotatable member, means associated with said drive shaft to cause rotation of said member upon rearward movement of said vehicle, a second member axially slidable and capable of a limited rotation, said second member being in toothed engagement with said first member, a projecting portion on said second member, a stationary part engaged by said projecting portion when rotated by reason of rearward movement of the vehicle and limiting the rotation of said second member, said projecting portion and said stationary part having contacting surfaces so disposed as to urge said second member axially out of engagement with said first member, and means normally preventing disengagement of said second member from said first member but moved upon authorizing rearward movement of the vehicle to permit disengagement of said members.

8. In a vehicle having a drive shaft, the combination of a ratchet wheel, pawls engageable with said ratchet wheel to rotate said ratchet wheel upon rearward movement of said vehicle, a pawl carrier for said pawls rotated by said drive shaft, a member axially slidable and capable of a limited rotation, said member being in toothed engagement with said ratchet wheel, a projecting portion on said member, a stationary part engaged by said projecting portion when rotated by reason of rearward movement of the vehicle and limiting the rotation of said member, the surface of said stationary part engaged by said projecting part sloping in such a direction as to urge said member axially away from said ratchet wheel, and means normally preventing disengagement of said member from said ratchet wheel but moved upon authorizing rearward movement of the vehicle to permit disengagement of said member from said ratchet wheel.

9. In a vehicle having a transmission with forward and reverse positions, the combination of a ratchet wheel, pawls engageable with said ratchet wheel to rotate said ratchet wheel upon rearward movement of said vehicle, a member in engagement with said ratchet wheel for movement thereby when said ratchet wheel is rotated, means for preventing rearward movement of said vehicle operative upon movement of said member, means for disengaging said member from said ratchet wheel upon shifting said transmission into reverse position, said member and said ratchet wheel being adapted to again enter into engagement when after shifting said transmission out of reverse position said vehicle comes substantially to rest.

10. In a vehicle, the combination of a rotatable member, means for rotating said member upon rearward movement of said vehicle, a second member axially movable and capable of a limited rotation, said second member being in toothed engagement with said first member, means acting upon rotation of said second member to prevent rearward movement of the vehicle, the teeth on each of said members having substantially parallel sides and being of widths substantially equal to the spaces between the teeth of the other of said members, whereby said members can come into toothed engagement only when they are nearly at rest relative to one another.

11. In a vehicle having a transmission with forward and reverse positions, the combination of a rotatable member, means for rotating said member upon rearward movement of said vehicle, a second member axially movable and capable of a limited rotation, said second member being in toothed engagement with said first member, means limiting the rotation of said second member, means for disengaging said second member from said first member upon shifting said transmission into reverse position, and means urging said second member into engagement with said first member upon shifting said transmission out of reverse position, said teeth on each of said members having substantially parallel sides and being of widths substantially equal to the spaces between the teeth of the other of said members and having the opposing faces sloping at an angle to the plane of rotation in such direction that rotation of said first member resulting from rearward movement of the vehicle forces said second member away from said first member, whereby said members can come into toothed engagement only when they are nearly at rest relative to one another.

12. In a vehicle, the combination of a ratchet wheel, pawls engageable with said ratchet wheel to rotate said ratchet wheel upon rearward movement of said vehicle, a member axially movable and capable of a limited rotation, said member being in toothed engagement with said ratchet wheel, means acting upon rotation of said member to prevent rearward movement of said vehicle, said teeth on each of said ratchet wheel and said member having substantially parallel sides inclined at an angle to the axis of rotation in such direction that torque applied by the ratchet wheel to turn said member in a direction corresponding to rearward movement of the vehicle urges said member out of engagement with said ratchet wheel, and said teeth on each of said ratchet wheel and said member being of widths substantially equal to the spaces into which they fit during toothed engagement whereby said member can come into toothed engagement with said ratchet wheel only when said ratchet wheel is nearly at rest relative to said member.

13. In a vehicle having a transmission with forward and reverse positions, the combination of a ratchet wheel, pawls engageable with said ratchet wheel to rotate said ratchet wheel upon rearward movement of said vehicle, a member axially movable and capable of a limited rotation, said member being in toothed engagement with said ratchet wheel, means limiting the rotation of said member, means normally preventing disengagement of said member from said ratchet wheel but moved upon shifting said transmission into reverse position to permit disengagement of said member from said ratchet wheel, and means urging said member into engagement with said ratchet wheel upon shifting said transmission out of reverse position, said teeth on each of said ratchet wheel and said member having substantially parallel sides inclined at an angle to the axis of rotation in such direction that torque applied by the ratchet wheel to turn said member in a direction corresponding to rearward movement of the vehicle urges said member out of engagement with said ratchet wheel, and said teeth on each of said ratchet wheel and said member being of widths substantially equal to the spaces into which they fit during toothed engagement and having opposing faces sloping at an angle to the plane of rotation in such direction that rotation of said ratchet wheel resulting from rearward movement of the vehicle forces said member away from said ratchet wheel, whereby said member can come into toothed engagement with said ratchet wheel only when said ratchet wheel is nearly at rest relative to said member.

14. In a vehicle equipped with brakes and a fluid containing system wherein fluid is moved for application of said brakes, the combination of a check valve in said system permitting fluid to flow in such direction as to apply the brakes but closable to prevent return of said fluid and to maintain said brakes applied, means normally holding said valve open, means responsive to fluid pressure incident to application of said brakes for making inoperative said first means, and means operative when said vehicle is at rest for maintaining said first means in inoperative condition.

15. In a vehicle equipped with brakes and a fluid containing system wherein fluid is moved for application of said brakes, the combination of a check valve in said system permitting fluid to flow in such direction as to apply the brakes but closable to prevent return of said fluid and to thereby maintain said brakes applied, means adapted to engage said valve to open it, a spring normally exerting force on said means to hold open said valve, a fluid chamber in communication with the entrance passage of said valve, a piston in said chamber in connection with said valve opening means in such manner that fluid pressure in said chamber incident to application of said brakes moves said valve opening means in opposition to said spring and permits said valve to close, and means operative when said vehicle is at rest for preventing said spring from exerting force on said valve opening means.

16. In a vehicle having a drive shaft and equipped with brakes and a fluid containing system wherein fluid is moved for application of said brakes, the combination of a check valve in said system permitting fluid to flow in such direction as to apply the brakes but closable to prevent return of said fluid and to thereby maintain said brakes applied, means normally holding said valve open, means responsive to pressure of fluid in the entrance passage of said valve when said brakes are applied for making inoperative said first means, a ratchet wheel, pawls rotated by said drive shaft and engageable with said ratchet wheel when said vehicle is at rest to restrain said ratchet wheel from rotation in one direction, and an operative connection between said ratchet wheel and said first-mentioned means in such manner that said first-mention means is maintained in inoperative condition when said ratchet wheel is restrained from rotation.

17. In a vehicle having a drive shaft and equipped with brakes and a fluid containing system wherein fluid is moved for application of said brakes, the combination of a check valve in said system permitting fluid to flow in such direction as to apply the brakes but closable to prevent return of said fluid and to thereby maintain said brakes applied, means normally holding said valve open, means responsive to pressure of fluid in the entrance passage of said valve upon application of said brakes for making inoperative said first means, a ratchet wheel, pawls rotated by said drive shaft and engageable with said ratchet wheel in such manner that when said vehicle is at rest said ratchet wheel is restrained from forward rotation, an operative connection between said ratchet wheel and said first-mentioned means designed to maintain said first-mentioned means inoperative when said ratchet wheel is restrained from rotation, and means for disconnecting said first-mentioned means from said ratchet wheel upon authorizing rearward movement of the vehicle.

18. In a vehicle having an ignition circuit and equipped with brakes and a fluid containing system wherein fluid is moved for application of said brakes, the combination of a check valve in said system permitting fluid to flow in such direction as to apply the brakes but closable to prevent return of said fluid and to maintain said brakes applied, means normally holding said valve open, means responsive to fluid pressure in the entrance passage of said valve for making inoperative said first means, means operative when said vehicle is at rest for maintaining said first means in inoperative condition, and additional means for opening said valve acting upon opening said ignition circuit.

19. In a vehicle having a drive shaft and equipped with fluid pressure operated brakes, the combination of a fluid containing system in connection with said fluid pressure operated brakes, a master cylinder in said system, means for manually forcing fluid from said master cylinder toward said brakes for applying said brakes, a check valve in said system permitting fluid to flow from said master cylinder toward said brakes but closable to prevent return of said fluid and to maintain said brakes applied, means normally holding said valve open, means acting upon application of said brakes to make inoperative said last-mentioned means, and means associated with said drive shaft and operative when said drive shaft is not in rotation to maintain in inoperative condition said means for holding open said valve.

20. In a vehicle having an ignition circuit and equipped with a service brake and a parking brake, the combination of a member movable to apply said parking brake, means for applying said service brake, means connected with said service brake applying means acting when said service brake is applied to move said member in the direction required for applying the parking brake, and means operative when said ignition circuit is open and said service brake is applied for retaining said member in the position to which it is moved by application of said service brake.

21. In a vehicle having an ignition circuit and equipped with a service brake and a parking brake, the combination of a member movable to apply said parking brake, means for applying said service brake, a ratchet and pawl connection between said member and said service brake applying means acting when said service brake is applied to move said member in the direction for applying said parking brake, a ratchet on said movable member, and a pawl adapted to engage said last-mentioned ratchet when said ignition circuit is open and said service brake is applied to retain said member in the position to which it is moved upon application of said service brake.

22. In a vehicle having an ignition circuit and equipped with a service brake and a parking brake, the combination of a member movable to apply said parking brake, means for applying said service brake, a ratchet and pawl connection between said member and said service brake applying means acting when said service brake is applied to move said member in the direction for applying said parking brake, a ratchet on said movable member, a pawl on a stationary pivot and engageable with said last-mentioned ratchet to retain said member in the position to which it is moved upon application of said service brake, a spring urging said last-mentioned pawl out of engagement with the ratchet on said movable member, an electromagnet adapted upon being energized to bring said last-mentioned pawl into engagement with said ratchet on the movable member, a switch adapted to be closed upon application of said service brake, and means electrically energizing said electromagnet through said switch when said ignition circuit is open.

23. In a vehicle having an ignition circuit and equipped with a service brake and a parking brake, the combination of a member movable to apply said parking brake, means for applying said service brake, a ratchet on said movable member, a second member movable adjacent said first member and connected with said service brake applying means for movement upon application of said service brake, a pawl pivoting in said second member and adapted to engage said ratchet to move said ratchet upon application of said service brake, means operative when said ignition circuit is open and said service brake is applied for retaining said member in the position to which it is moved by application of said service brake, and a stationary element in the path of said pawl upon return of said second member following release of said service brake and adapted to engage said pawl to move it out of possible engagement with said ratchet.

24. In a vehicle, the combination of a rotatable member, means tending to rotate said member only upon rearward movement of said vehicle, a second member axially slidable and in toothed engagement with said first member, means limiting rotation of said second member, a third member rotatable and connected for axial movement with said second member, means adapted in the normal position of said third member to prevent axial movement of said second and third members away from said first member but upon rotation of said third member to permit axial movement of said second and third members away from said first member, means for rotating said third member out of its normal position upon authorizing rearward movement of said vehicle, and means acting upon continued rotation of said third member to axially move said second and third members away from said first member to disengage said second member from said first member and hold it disengaged.

25. In a vehicle having a transmission with forward and reverse positions and a drive shaft, the combination of a ratchet wheel, pawls engageable with said ratchet wheel tending to rotate said ratchet wheel upon rearward movement of said vehicle, a pawl carrier for said pawls rotated by said drive shaft, a member in toothed engagement with said ratchet wheel, means limiting rotation of said member, a second member rotatable and connected for axial movement with said first member, said second member and a stationary part of said vehicle having projecting surfaces opposed in contact in the normal position of said second member in such manner as to prevent axial movement of said first and second members away from said ratchet wheel, a surface on said second member sloping with respect to the axis thereof, and an element in engagement with said sloping surface and adapted to be moved toward said surface upon shifting said transmission into reverse position in such manner as to cause rotation of said second member from its normal position, whereby the projecting surface of said second member is rotated out of opposition with the projecting surface of said stationary part and said first and second members are permitted to move axially away from said ratchet wheel.

26. In a vehicle having a transmission with forward and reverse positions, the combination of a rotatable member, means tending to rotate said member upon rearward movement of said vehicle, a second member axially movable and in rotative engagement with said first member, means limiting rotation of said second member, means for disengaging said second member from said first member upon shifting said transmission into reverse position, said second member and said first member being adapted to again enter into engagement when after shifting said transmission out of reverse position said vehicle comes substantially to rest.

27. In a vehicle, the combination of a rotatable member, means tending to rotate said member upon rearward movement of said vehicle, a second member axially movable and in toothed engagement with said first member, means limiting rotation of said second member, the teeth on each of said members having substantially parallel sides and being of widths substantially equal to the spaces between the teeth of the other of said members, whereby said members can come into toothed engagement only when they are nearly at rest relative to one another.

28. In a vehicle, the combination of a ratchet wheel, pawls engageable with said ratchet wheel tending to rotate said ratchet wheel upon rearward movement of said vehicle, a member axially movable and in toothed engagement with said ratchet wheel, means limiting rotation of said member, said teeth on each of said ratchet wheel and said member having substantially parallel sides inclined at an angle to the axis of rotation in such direction that torque applied by the ratchet wheel to turn said member in a direction corresponding to rearward movement of the vehicle urges said member out of engagement with said ratchet wheel, and said teeth on each of said ratchet wheel and said member being of widths substantially equal to the spaces into which they fit during toothed engagement whereby said member can come into toothed engagement with said ratchet wheel only when said ratchet wheel is nearly at rest relative to said member.

29. In a vehicle equipped with brakes and a fluid containing system wherein fluid is moved for application of said brakes, the combination of valve means in said system permitting fluid to flow in such direction as to apply the brakes, a movable member cooperating with said valve means and adapted to assume a normal position in which said valve means permit return of said fluid following application of said brakes and an operated position in which said valve means prevent return of said fluid, normally operative means maintaining said member in normal position, means responsive to fluid pressure incident to application of said brakes for moving said member to operated position, and means operative when said vehicle is at rest for preventing said normally operative means from returning said member to normal position.

30. In a vehicle having a drive shaft and equipped with brakes and a fluid containing system wherein fluid is moved for application of said brakes, the combination of valve means in said system permitting fluid to flow in such direction as to apply the brakes, a movable member cooperating with said valve means and adapted to assume a normal position in which said valve means permit return of said fluid following application of said brakes and an operated position in which said valve means prevent return of said fluid, normally operative means maintaining said member in normal position, means responsive to fluid pressure incident to application of said brakes for moving said member to operated position, a ratchet wheel, pawls rotated by said drive shaft and engageable with said ratchet wheel when said vehicle is at rest to restrain said ratchet wheel from rotation in one direction, and an operative connection between said ratchet wheel and said normally operative means adapted to prevent said normally operative means from returning said member to normal position when said ratchet wheel is restrained for rotation.

31. In a vehicle having an ignition circuit and equipped with brakes and a fluid containing system wherein fluid is moved for application of said brakes, the combination of valve means in said system permitting fluid to flow in such direction as to apply the brakes, a movable member cooperating with said valve means and adapted to assume a normal position in which said valve means permit return of said fluid following application of said brakes and an operated position in which said valve means prevent return of said fluid, normally operative means maintaining said member in normal position, means responsive to fluid pressure incident to application of said brakes for moving said member to operated position, means operative when said vehicle is at rest for preventing said normally operative means from returning said member to normal position, and additional means acting upon opening said ignition circuit for returning said member to normal position.

CHARLES M. JAMESON.